US012587880B2

(12) United States Patent (10) Patent No.: US 12,587,880 B2
Huda et al. (45) Date of Patent: Mar. 24, 2026

(54) AUTONOMOUS DRIVE TESTS IN WIRELESS COMMUNICATION SYSTEMS

(71) Applicant: AT&T Intellectual Property I, L.P., Atlanta, GA (US)

(72) Inventors: Eshrat Huda, Hillsborough, NJ (US); David Lu, Irving, TX (US); Moshiur Rahman, Marlboro, NJ (US); Russell Fischer, Bernardsville, NJ (US); Prafulla Verma, Holmdel, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 526 days.

(21) Appl. No.: 18/077,467

(22) Filed: Dec. 8, 2022

(65) Prior Publication Data

US 2024/0196238 A1 Jun. 13, 2024

(51) Int. Cl.
*H04W 24/08* (2009.01)
*H04W 16/18* (2009.01)
*H04W 24/02* (2009.01)
(52) U.S. Cl.
CPC ........... *H04W 24/08* (2013.01); *H04W 16/18* (2013.01); *H04W 24/02* (2013.01)
(58) Field of Classification Search
CPC .... G08G 1/0124; H04W 24/08; H04W 16/18; H04W 24/02; H04W 24/10
See application file for complete search history.

(56) References Cited

U.S. PATENT DOCUMENTS

2017/0331577 A1 * 11/2017 Parkvall .............. H04L 27/2602

OTHER PUBLICATIONS

Aalorg University, "A USRP-based Channel Sounder for UAV Communications", 14th European Conference on Antennas and Propagation (EuCAP), 2020, 5 pages.
Khawaja, W., et al., "UAV Air-toGround Channel Characterization for mmWave Systems", accessed from https://par.hsf.gov/servlets/purl/10042432 on Nov. 14, 2022, 5 pages.

* cited by examiner

*Primary Examiner* — Diane D Mizrahi

(57) ABSTRACT

A processing system of a cellular network may receive at least a first measurement of at least one network performance indicator associated with the cellular network from at least one of: at least a first channel sounding measurement record from at least a first autonomous vehicle (AV), or a communication from at least one mobile endpoint device or at least one component of the cellular network. The processing system may next identify at a condition of a location based upon the first measurement and may direct at least one of: the first AV or a second AV to the location to capture at least a second channel sounding measurement record. The processing system may then obtain from the first AV or the second AV the at least the second channel sounding measurement record, and may adjust at least one aspect of the cellular network in response.

20 Claims, 4 Drawing Sheets

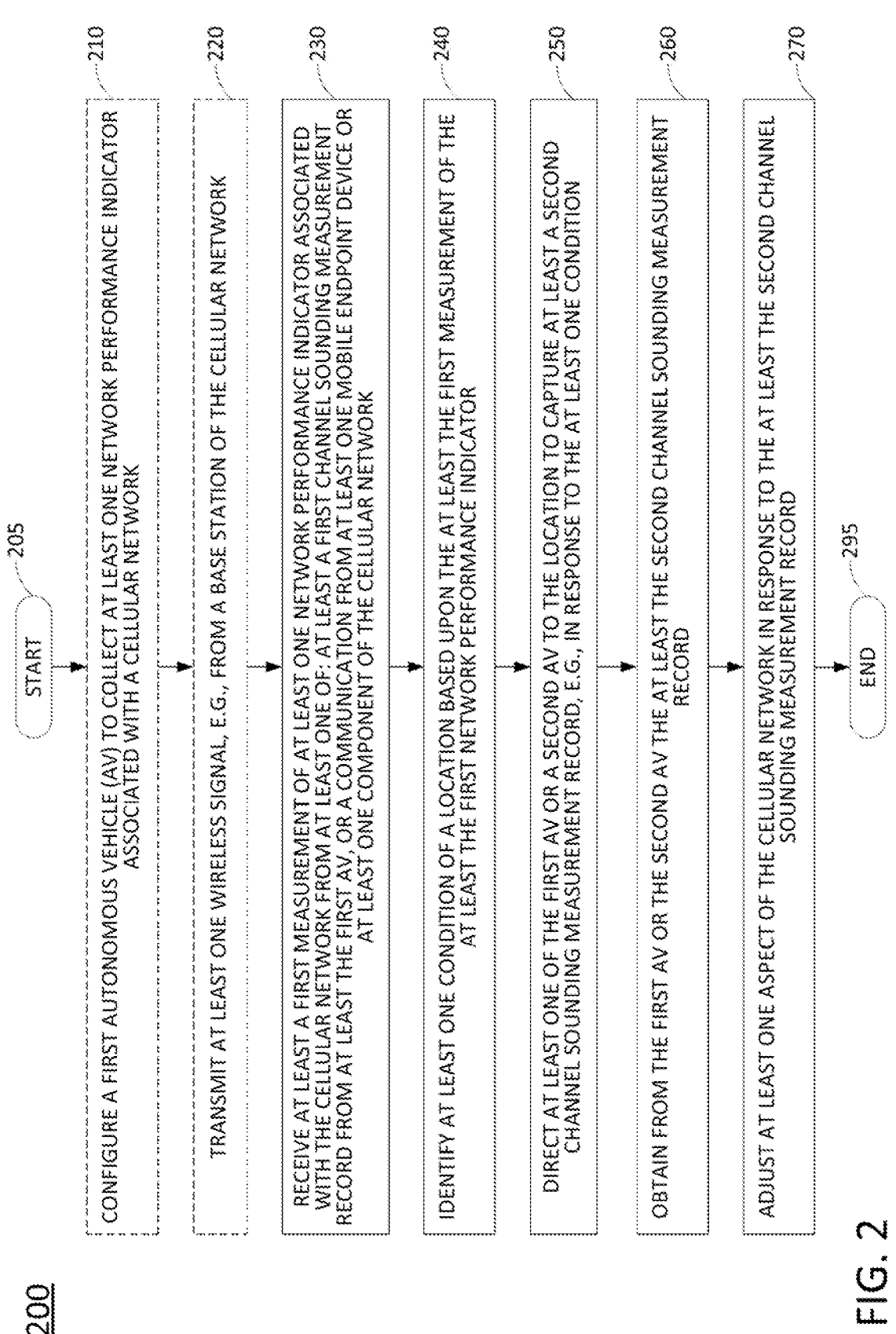

200

START — 205

CONFIGURE A FIRST AUTONOMOUS VEHICLE (AV) TO COLLECT AT LEAST ONE NETWORK PERFORMANCE INDICATOR ASSOCIATED WITH A CELLULAR NETWORK — 210

TRANSMIT AT LEAST ONE WIRELESS SIGNAL, E.G., FROM A BASE STATION OF THE CELLULAR NETWORK — 220

RECEIVE AT LEAST A FIRST MEASUREMENT OF AT LEAST ONE NETWORK PERFORMANCE INDICATOR ASSOCIATED WITH THE CELLULAR NETWORK FROM AT LEAST ONE OF: AT LEAST A FIRST CHANNEL SOUNDING MEASUREMENT RECORD FROM AT LEAST THE FIRST AV, OR A COMMUNICATION FROM AT LEAST ONE MOBILE ENDPOINT DEVICE OR AT LEAST ONE COMPONENT OF THE CELLULAR NETWORK — 230

IDENTIFY AT LEAST ONE CONDITION OF A LOCATION BASED UPON THE AT LEAST THE FIRST MEASUREMENT OF THE AT LEAST THE FIRST NETWORK PERFORMANCE INDICATOR — 240

DIRECT AT LEAST ONE OF THE FIRST AV OR A SECOND AV TO THE LOCATION TO CAPTURE AT LEAST A SECOND CHANNEL SOUNDING MEASUREMENT RECORD, E.G., IN RESPONSE TO THE AT LEAST ONE CONDITION — 250

OBTAIN FROM THE FIRST AV OR THE SECOND AV THE AT LEAST THE SECOND CHANNEL SOUNDING MEASUREMENT RECORD — 260

ADJUST AT LEAST ONE ASPECT OF THE CELLULAR NETWORK IN RESPONSE TO THE AT LEAST THE SECOND CHANNEL SOUNDING MEASUREMENT RECORD — 270

END — 295

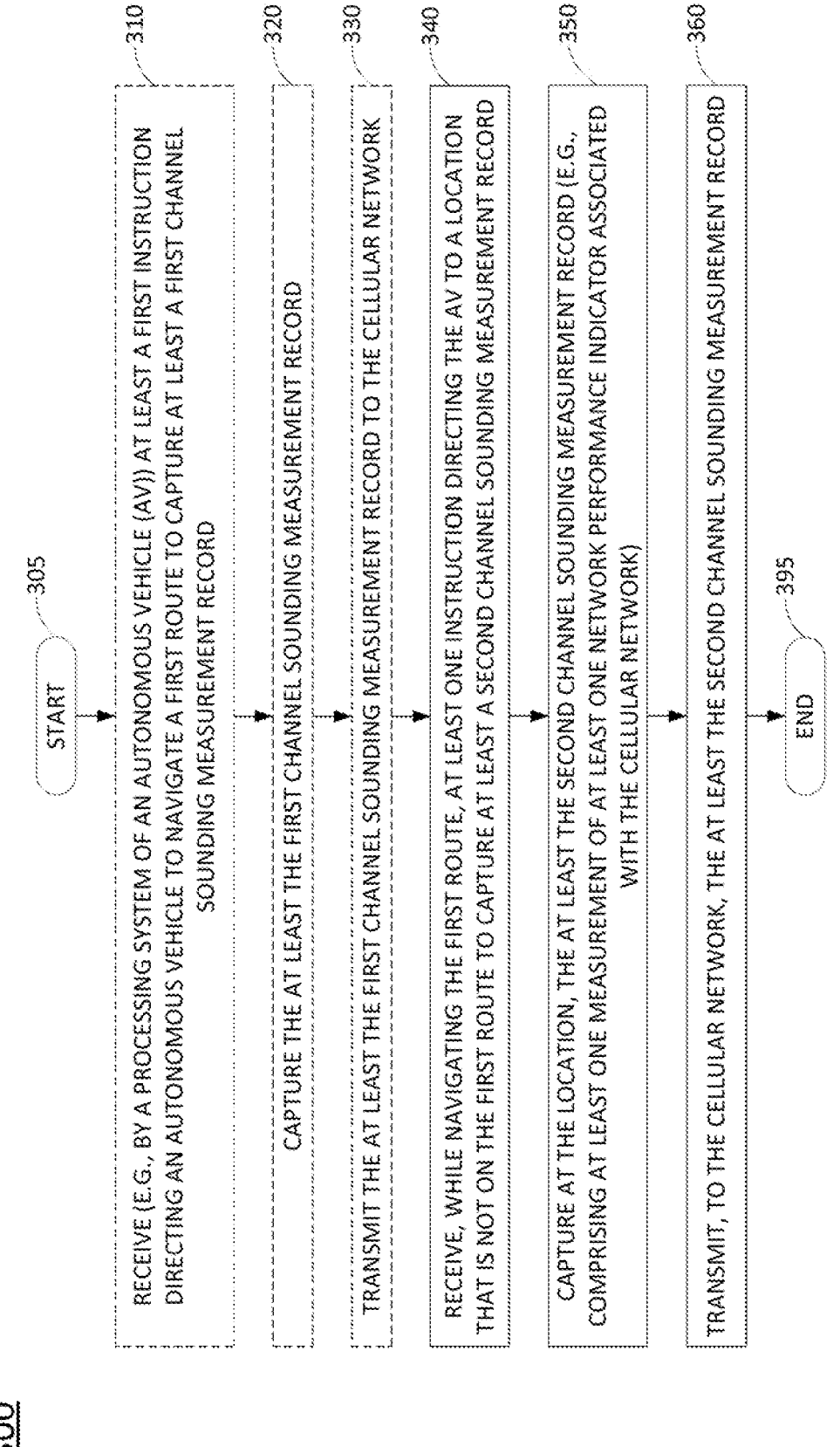

START ~305

RECEIVE (E.G., BY A PROCESSING SYSTEM OF AN AUTONOMOUS VEHICLE (AV)) AT LEAST A FIRST INSTRUCTION DIRECTING AN AUTONOMOUS VEHICLE TO NAVIGATE A FIRST ROUTE TO CAPTURE AT LEAST A FIRST CHANNEL SOUNDING MEASUREMENT RECORD ~310

CAPTURE THE AT LEAST THE FIRST CHANNEL SOUNDING MEASUREMENT RECORD ~320

TRANSMIT THE AT LEAST THE FIRST CHANNEL SOUNDING MEASUREMENT RECORD TO THE CELLULAR NETWORK ~330

RECEIVE, WHILE NAVIGATING THE FIRST ROUTE, AT LEAST ONE INSTRUCTION DIRECTING THE AV TO A LOCATION THAT IS NOT ON THE FIRST ROUTE TO CAPTURE AT LEAST A SECOND CHANNEL SOUNDING MEASUREMENT RECORD ~340

CAPTURE AT THE LOCATION, THE AT LEAST THE SECOND CHANNEL SOUNDING MEASUREMENT RECORD (E.G., COMPRISING AT LEAST ONE MEASUREMENT OF AT LEAST ONE NETWORK PERFORMANCE INDICATOR ASSOCIATED WITH THE CELLULAR NETWORK) ~350

TRANSMIT, TO THE CELLULAR NETWORK, THE AT LEAST THE SECOND CHANNEL SOUNDING MEASUREMENT RECORD ~360

END ~395

AUTONOMOUS DRIVE TESTS IN WIRELESS COMMUNICATION SYSTEMS

The present disclosure relates generally to cellular networks and the operation thereof, and more particularly to apparatuses, non-transitory computer readable media, and methods for adjusting at least one aspect of a cellular network in response to at least one channel sounding measurement record obtained from an autonomous vehicle, and to apparatuses, non-transitory computer readable media, and methods for transmitting channel sounding measurement records captured by an autonomous vehicle to a cellular network.

BACKGROUND

Traditionally, cellular network coverage has been optimized through drive tests. Drive tests encompass a technician who drives a vehicle equipped with measurement devices to create a coverage map of the service area by correlating measurements of the received signal strength with the vehicle's location. The received signal strength may, for instance, be the reference signal received power (RSRP) and the measurement equipment may tag the measurements with the vehicle's geographic location by means of a Global Positioning System (GPS) receiver. However, such drive tests are costly and labor intensive. The Third Generation Partnership Project (3GPP) Long Term Evolution (LTE) wireless communications standard specifies a feature called Minimization of Drive Tests (MDT). For example, a user equipment (UE) may perform certain measurements in order to establish and maintain connectivity with the radio access network (RAN), such as RSRP. The MDT feature leverages the existing location based services available at the UE by tagging existing measurements with a location and time stamp, and logging measurements at the UE for later reporting to the network.

SUMMARY

In one example, the present disclosure discloses a method, computer-readable medium, and apparatus for adjusting at least one aspect of a cellular network in response to at least one channel sounding measurement record obtained from an autonomous vehicle. For example, a processing system of a cellular network having at least one processor may receive at least a first measurement of at least one network performance indicator associated with the cellular network from at least one of: at least a first channel sounding measurement record from at least a first autonomous vehicle, or a communication from at least one mobile endpoint device or at least one component of the cellular network. The processing system may next identify at least one condition of a location based upon the at least the first measurement of the at least the first network performance indicator and direct at least one of: the first autonomous vehicle or a second autonomous vehicle to the location to capture at least a second channel sounding measurement record associated with at least one wireless signal from at least one base station of the cellular network. The processing system may then obtain from the first autonomous vehicle or the second autonomous vehicle the at least the second channel sounding measurement record, and may adjust at least one aspect of the cellular network in response to the at least the second channel sounding measurement record.

In another example, the present disclosure discloses a method, computer-readable medium, and apparatus for transmitting channel sounding measurement records captured by an autonomous vehicle to a cellular network. For example, a processing system of an autonomous vehicle having at least one processor and at least one cellular receiver may receive at least a first instruction directing the autonomous vehicle to navigate a first route to capture at least a first channel sounding measurement record. The processing system may next receive, while the autonomous vehicle is navigating the first route, at least one instruction directing the autonomous vehicle to a location that is not on the first route to capture at least a second channel sounding measurement record. The processing system may then capture, at the location, the at least the second channel sounding measurement record, and transmit the at least the second channel sounding measurement record to the cellular network.

BRIEF DESCRIPTION OF THE DRAWINGS

The teachings of the present disclosure can be readily understood by considering the following detailed description in conjunction with the accompanying drawings, in which:

FIG. 2 illustrates a flowchart of an example method for adjusting at least one aspect of a cellular network in response to at least one channel sounding measurement record obtained from an autonomous vehicle;

FIG. 3 illustrates a flowchart of an example method for transmitting channel sounding measurement records captured by an autonomous vehicle to a cellular network, and the locations and orientations of the mobile endpoint device, to a cellular network.

To facilitate understanding, similar reference numerals have been used, where possible, to designate elements that are common to the figures.

DETAILED DESCRIPTION

Figure 1:
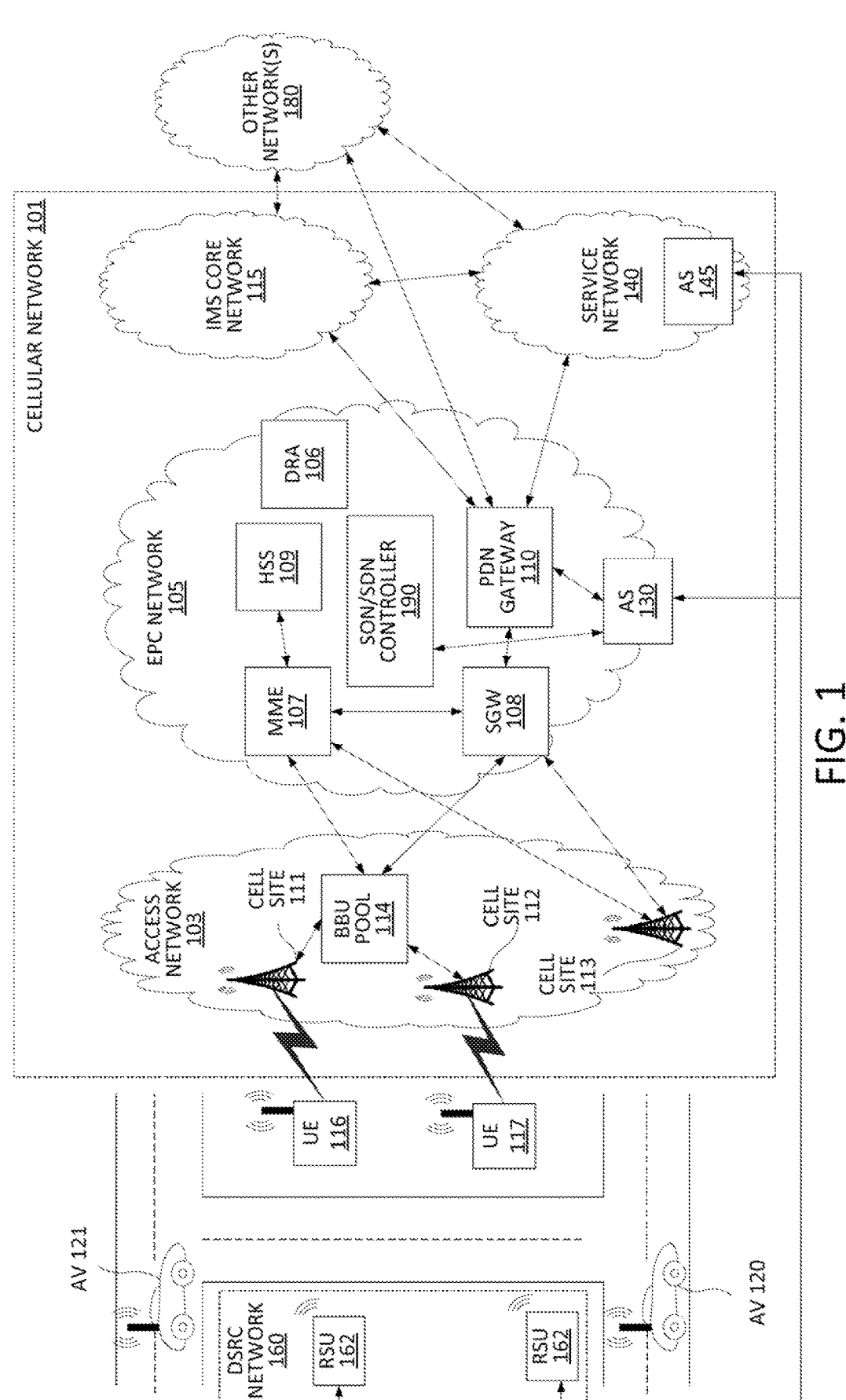
FIG. 1 illustrates a block diagram of an example system, in accordance with the present disclosure.

The present disclosure broadly discloses methods, computer-readable media, and apparatuses for adjusting at least one aspect of a cellular network in response to at least one channel sounding measurement record obtained from an autonomous vehicle, and methods, computer-readable media, and apparatuses for transmitting channel sounding measurement records captured by an autonomous vehicle to a cellular network. In particular, examples of the present disclosure describe artificial intelligence (AI)/machine learning (ML)-enabled autonomous drive testing for measuring and assessing the coverage, capacity, and quality of service (QOS) of a mobile radio network, and for configuring and/or reconfiguring the mobile radio network based on drive test results, e.g., in a software define network (SDN) architecture. In one example, the present disclosure provides an advanced dynamic implementation by leveraging a cloud-based and/or network-based drive test/channel sounding system (e.g., a processing system), which may comprise or which may be in communication with an SDN controller. Thus, in addition to collecting and processing radio frequency (RF) and other QoS-related test data and detecting network problems, examples of the present disclosure also provide and implement actionable recommendations. Examples of the present disclosure may employ one or more autonomous vehicles (AVs), which may be ground surface operating (e.g., a car, motorcycle, etc.), water surface operating (e.g., a boat), or airborne (e.g., an uncrewed aerial vehicle (UAV)). In each case, the AV may include an intelligent onboard unit (OBU) comprising a processing system (e.g., a computing device or apparatus) and at least one cellular receiver (or transceiver) (which may be a part of the OBU or in communication with the OBU).

In general, drive test operations may broadly include network performance indicator data collection and data analysis. In one example, drive testing may comprise and/or may alternatively be referred to "channel sounding." Through the analysis of network performance indicators (or "key performance indicators" (KPIs)), network problems may be identified, such as dropped calls, interference, network attacks, etc. Autonomous vehicle (uncrewed) drive tests allow a shortened analysis cycle. The analysis may include identifying coverage zones of each cell sector, identifying locations or areas of interference, evaluating network changes, and various other parameters. Notably, instead of pre-built drive test logic and pre-determined target routes that an AV may take and collect data, an AV of the present disclosure may be configured to dynamically receive routes/paths from the cellular network (e.g., from a drive test/channel sounding system) in real-time (e.g., at the same time and the AV is engaged in a current drive test measurement task or otherwise while in motion or engaged in operations (e.g., charging, traveling between measurement sites, etc.)). The AV's OBU may navigate a route, e.g., toward an instructed location, using a global positioning system (GPS) navigation unit of the AV, or the like. In an illustrative example, a network operator may more efficiently address a group of cells by instructing an AV to pass through particular locations/paths/routes near those dynamically identified cells to investigate the network health, such as RF interference, accordingly.

Notably, examples of the present disclosure employ AVs for uncrewed drive test data collection. In one example, collected data is offloaded from the AV's OBUs to intelligent roadside units (RSUs) and then to a drive test/channel sounding server or the like. In one example, the drive test/channel sounding system may apply AI and/or ML analysis to the collected test data, e.g., to perform root cause analysis or the like, to identify locations or areas of network problems or apparent network problems, to identify locations or areas with insufficient or inconclusive network performance indicator measurements, and so forth. In response to such analysis, the drive test/channel sounding system may provide route recommendations, or route instructions to one or more AVs (e.g., the OBUs thereof) for target data collection. In addition, in response to such analysis and/or in response to further analysis based on additional network performance indicator measurements after redirecting one or more AVs, the drive test/channel sounding system may also provide actionable recommendations and/or instructions to one or more network elements to configure and/or reconfigure the network.

Thus, OBUs of AVs may dynamically receive routes/paths from a drive test/channel sounding system. Based on the network performance indicator measurements (such as RF interference ratio, call drops, etc.), the drive test/channel sounding system may identify additional cell sites or sectors for drive testing (and/or cell sites or sectors to revisit for collecting additional test data). Since drive testing is time-consuming, expensive, and often fails to recognize the root cause(s) of a failure, the present approach may further the network's ability to generate more accurate reports, for example pertaining to call setup and coverage issues, RF interference, and so forth, for consumption by network personnel and/or for one or more other automated systems. For instance, AI/ML analysis of network performance indicator measurements captured by AVs dynamically routed in the field represent a true picture of network conditions and can be used in decision making in several areas, from planning and design, optimization and network maintenance, and so forth, thus furthering the ability to maximize quality, capacity, and coverage of the mobile network.

In accordance with the present disclosure, a channel sounding measurement record may include measurements of one or more network performance indicators (e.g., one or more "key performance indicators" (KPIs)). In addition, in various examples, a channel sounding measurement record may further include spatial orientation information, such as azimuth and elevation angles for receive and/or transmit beam directions, location(s) associated with the measurement(s), time stamp(s), and so forth. In other words, a channel sounding measurement record may include one or more network performance indicator measurement(s) and may further include one or more supplemental information elements. An AV may include at least one cellular receiver and/or transceiver (broadly a "radio unit") that is equipped to operate according to the specification of the considered wireless cellular communications standard (e.g., long term evolution (LTE), 5G multiple input multiple output (MIMO) and/or millimeter wave, etc.). However, the radio unit may be configured with additional capabilities, including the ability to beam sweep the receive beam, and so on. An AV may further include a Global Positioning System (GPS) navigation unit, which may enable the AV to navigate a specified route and to also identify locations at which network performance indicator measurements are collected.

In one example, an AV may store a performance indicator measurement in a channel sounding measurement record (in some examples along with the spatial orientation information, time stamp, and/or a location associated with the performance indicator measurement) in a local memory (e.g., of the OBU) until polled by the cellular network for transmission. In another example, the AV may indicate to the cellular network that it has one or more channel sounding measurement records ready for transmission to the cellular network. In one example, the AV may periodically or opportunistically offload channel sounding measurement records to one or more RSUs (e.g., when available, when wireless connections are strong, etc.).

In addition to dynamically instructing AVs to navigate selected routes, the cellular network may configure AVs (e.g., the OBUs thereof) with instructions on when to start and stop collecting the network performance indicator measurements (along with spatial orientation information and locations associated with the performance indicator measurements), to collect the performance indicator measurements (along with spatial orientation information and locations associated with the performance indicator measurements) while the AV (e.g., the OBU and/or radio unit thereof) is not connected to the cellular network, to collect a subset of network performance indicator measurements that the AV is capable of collecting (along with spatial orientation information and locations associated with the performance indicator measurements), to report a subset of the network performance indicator measurement records that the AV has collected, to utilize a particular location determination technique, and so on. In one example, the AV may indicate to the cellular network when it is available for use in navigating a route and/or collecting network performance indicator measurements. For instance, an AV may be stuck in traffic and although connected to the network, may be practically unavailable. Similarly, an AV may detect a flat tire and report unavailability to the network. In one example, the AV may time stamp the network performance indicator measurements or channel sounding record(s) containing such measurements. In another example, a time stamp associated with a network performance indicator measurement and/or channel sounding measurement record may be implicit by the format in which the measurements are stored (e.g., sequentially in a database, where records in the database are associated with measurements taken at a given time interval).

Notably, the availability of millimeter wave spectrum for 3rd Generation Partnership Project (3GPP) 5G deployments gives rise to many opportunities for communications services in various frequency bands. In addition, 5G cellular networks call for the use of directional antennas for beamforming. In one example, the cellular network may deploy one or more AVs to a location (and/or a cell or sector) in response to network performance indicators obtained via endpoint devices (e.g., user equipment (UE)) and/or from network components, such as base stations, service gateways, etc. Thus, examples of the present disclosure allow the cellular network to identify the radio conditions encountered by mobile endpoint devices, such as during beam failure and radio link interruption events, by directing one or more AVs to a location to collect additional network performance indicator measurements. In response, the cellular network may further optimize the transmit beams at a given base station antenna (or a sector of a nearby cell), deploy new antennas or activate additional antennas (e.g., a remote radio head (RRH)) that take into account the blocking of signals, adapt the locations of existing antennas, change how multiple antennas are oriented, change the boresight of existing antenna arrays without changing the transmitters locations, and so forth. Notably, drive tests may be minimized by focusing AVs on the most needed locations and/or routes, reducing operating expenses and overhead associated with the collection of such measurements, and reducing the number of instances in which technicians are deployed to fix reception issues based on the network performance indicator measurements.

In one example, an AV may perform synchronization signal (SS) block reference signal received power (RSRP) and/or channel state information (CSI)-RSRP measurements, e.g., as part of beam management (BM) and/or beam recovery (BR) procedures in accordance with a cellular communication protocol employed by the cellular network and implemented at the base station and the AV (e.g., at an OBU and/or radio unit thereof). In one example, the AV may tag a SS block RSRP and/or CSI-RSRP measurement with a location tag. For instance, the location may be added to a record for the network performance indicator measurement (e.g., in a channel sounding measurement record). The network performance indicator measurements may be layer 1 (L1) or layer 3 (L3) filtered, beam-specific or cell-specific, and different combinations of measurement types may be collected and tagged by an AV (e.g., by the OBU thereof) with location information and spatial orientation information.

Similarly, an AV may tag a network performance indicator measurement with directional/spatial orientation information, e.g., in addition to a location. For example, the AV may associate a SS block identifier (ID) with a RSRP measurement and the location of the measurement. Alternatively, the AV may associate a measurement configuration ID with the network performance indicator measurement, e.g., in a channel sounding measurement record for the network performance indicator measurement along with the location of the measurement. When uploaded to the cellular network, the cellular network may map the measurement configuration ID with a transmit beam that steered energy in a certain direction when transmitting the reference signal (RS) on which the reported network performance indicator measurement was captured. For instance, the measurement configuration ID may be transmitted in the RS from which the network performance indicator measurement is derived.

In yet another example, an AV may associate angle of arrival (AoA) with a network performance indicator measurement (and a location), (e.g., where the network performance indicator measurement relates to a received power). In one example, the AV may not tag a network performance indicator measurement (e.g., received signal strength) with spatial orientation information, but rather tag spatial orientation information of a measurement with the location. For instance, at a given location, the primary direction from which the signal energy arrives may comprise the network performance indicator, but not the actual received signal strength.

In one example, an AV may calculate a direction, or spatial orientation of a receive beam with respect to a local coordinate system, e.g., a three dimensional space with dimensions/axis aligned to a length, a width, and a depth of the mobile endpoint device. In one example, an AV may include a phased array of antenna elements that may be manufactured and/or configured to provide a number of possible receive beams (or receive beam directions/spatial orientations) within a given azimuth and elevation range. The AV may also translate a local orientation of a receive beam in a local coordinate system into a global orientation, e.g., in the global coordinate system. In one example, the translations may be based upon the difference between the local orientation and the global orientation, which can be estimated using a gyroscope and compass of the AV (e.g., of the OBU and/or the radio unit thereof).

In one example, the OBU and/or radio unit of an AV may be configured with a beam recovery procedure upon detection of a beam failure from one or more monitored beams (e.g., if the quality of an associated control channel drops below a threshold and/or upon expiration of a configured timer/counter). Thus, in one example, a "network performance indicator measurement" may be a notation of a radio link failure condition with respect to a particular directional beam. The record for a beam failure event may also include time stamp(s) associated with the beam failure event. In one example, a record of a beam recovery event may include one or more beam quality measurements/IDs corresponding to the beam(s) monitored by the AV during the beam recovery procedure, along with additional information, such as a modulation coding scheme (MCS) that was being utilized at the time of the event, and so forth.

In yet another example, an AV deployed to capture measurements at a location may experience a blockage event, such that a link quality is impacted before quickly being restored (e.g., due to another vehicle passing between the AV and a base station, or the like), before beam recovery or radio link failure (RLF) procedures are completed, and so forth. In accordance with the present disclosure, these radio link interruption (RLI) events (e.g., the occurrence of the events, the locations of these events, and the spatial orientations of receive/transmit beams associated with these events) may be recorded at the AV and reported to the cellular network. The cellular network may utilize such information to adjust the configuration of beam management related measurement resources, timer/counters at the mobile endpoint device, or at mobile endpoint devices in general, and so on. The AV collected channel sounding measurement records of such RLI events may include a time-stamp, location, and duration of the RLI event along with one or more beam quality measurements/IDs corresponding to the beam(s) monitored by the AV during the beam failure/recovery procedures.

In yet another example, the AV may be configured to record events related to random access channel (RACH) procedures, including location(s) and spatial orientation information, and report to the cellular network. The RACH event recording may also include a time stamp and other relevant parameters, such as a duration of a RACH failure event, RACH resources selected by the AV (e.g., preamble format, number of repetitions, time/frequency resources, etc.), transmission power, and transmit/receive (Tx/Rx) beamforming utilized at the mobile endpoint device. As such, the cellular network may determine uplink coverage holes or gaps, adjust related RACH configuration parameters at mobile endpoint devices or the base station (e.g., a gNodeB or gNB), and so on.

In one example, an AV may be instructed to detect and measure signals and channels related to initial access procedures (e.g., a primary synchronization signal (PSS), a secondary synchronization signal (SSS), a physical broadcast channel (PBCH), and/or a downlink modulation reference signal (DMRS) contained within a synchronization signaling (SS) block). For instance, the AV may collect and tag performance indicator measurements without utilizing uplink transmission capabilities, except to report the records to the cellular network periodically or on demand. In this case, a performance indicator measurement configuration of the AV may be configured/loaded, e.g., dynamically along with instructions to navigate a route. In another example, the AV may measure a reference signal (RS), or multiple reference signals, in addition to the SS-block, such as a channel station information reference signal CSI-RS, via a predetermined or preloaded configuration that is identified along with the route instructions. These and other aspects of the present disclosure are discussed in greater detail below in connection with the examples of FIGS. 1-4.

To better understand the present disclosure, FIG. 1 illustrates an example network, or system 100 in which examples of the present disclosure may operate. In one example, the system 100 includes a cellular network 101 (e.g., a 4G/Long Term Evolution (LTE) network, a 4G/5G hybrid network, or the like), which may include a core network, e.g., an IP Multimedia Subsystem (IMS) core network 115, an access network 103, a service network 140, and so forth. The system 100 may further include other networks 180 and a dedicated short range communication (DSRC) network 160 connected to the cellular network 101. It should be noted that in one example, DSRC network 160 may comprise part of the cellular network 101. FIG. 1 also illustrates various mobile endpoint devices, e.g., user equipment (UE) 116 and 117, and autonomous vehicles (AVs) 120 and 121.

In one example, the access network 103 comprises a cloud RAN. For instance, a cloud RAN is part of the 3rd Generation Partnership Project (3GPP) 5G specifications for mobile networks. As part of the migration of cellular networks towards 5G, a cloud RAN may be coupled to an EPC network until new cellular core networks are deployed in accordance with 5G specifications. In one example, access network 103 may include cell sites 111 and 112 and a baseband unit (BBU) pool 114. In a cloud RAN, radio frequency (RF) components, referred to as remote radio heads (RRHs), may be deployed remotely from baseband units, e.g., atop cell site masts, buildings, and so forth. In one example, the BBU pool 114 may be located at distances as far as 20-80 kilometers or more away from the antennas/remote radio heads of cell sites 111 and 112 that are serviced by the BBU pool 114. It should also be noted in accordance with efforts to migrate to 5G networks, cell sites may be deployed with new antenna and radio infrastructures such as multiple input multiple output (MIMO) antennas, and millimeter wave antennas. In this regard, a cell, e.g., the footprint or coverage area of a cell site, may in some instances be smaller than the coverage provided by NodeBs or eNodeBs of 3G-4G RAN infrastructure. For example, the coverage of a cell site utilizing one or more millimeter wave antennas may be 1000 feet or less.

Although cloud RAN infrastructure may include distributed RRHs and centralized baseband units, a heterogeneous network may include cell sites where RRH and BBU components remain co-located at the cell site. For instance, cell site 113 may include RRH and BBU components. Thus, cell site 113 may comprise a self-contained "base station." With regard to cell sites 111 and 112, the "base stations" may comprise RRHs at cell sites 111 and 112 coupled with respective baseband units of BBU pool 114.

In accordance with the present disclosure, any one or more of cell sites 111-113 may be deployed with antenna and radio infrastructures, including multiple input multiple output (MIMO) and millimeter wave antennas. Furthermore, in accordance with the present disclosure, a base station (e.g., cell sites 111-113 and/or baseband units within BBU pool 114) may comprise all or a portion of a computing device or system, such as computing system 400, and/or processing system 402 as described in connection with FIG. 4 below. For instance, cell sites 111-113 and/or baseband units within BBU pool 114 may be configured to perform functions such as those described below in connection with the example methods of FIGS. 2 and 3, such as transmitting one or more channel sounding waveforms, activating or deactivating remote radio heads (RRHs) and/or BBUs, adjusting transmit power, cell/sector footprint (e.g., beam steering in azimuth and or elevation), and so forth.

Figure 4:
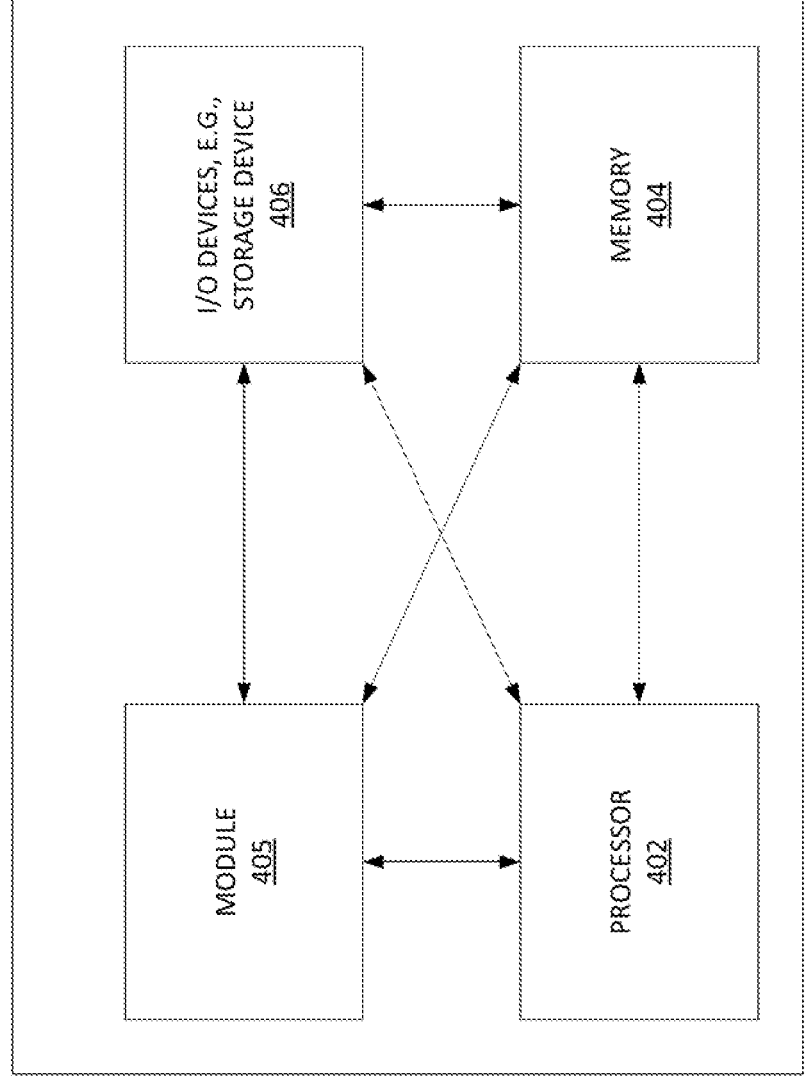
FIG. 4 illustrates an example of a computing device, or computing system, specifically programmed to perform the steps, functions, blocks, and/or operations described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

The UE 116 and 117 may each comprise a cellular telephone, a smartphone, a tablet computing device, a laptop computer, a pair of computing glasses, a wireless enabled wristwatch, or any other cellular-capable mobile telephony and computing devices (broadly, "a mobile endpoint device"). In one example, each of the UEs 116 and 117 may comprise all or a portion of a computing device or system, such as computing system 400, and/or processing system 402 as described in connection with FIG. 4 below, and may be configured to provide one or more functions such as those described below in connection with the example methods of FIGS. 2 and 3.

To illustrate, UE 116, UE 117 may receive at least one wireless signal from one of cell sites 111-113, capture a measurement of performance indicator based upon the at least one wireless signal, record location and spatial orientation information for the measurement of the performance indicator, transmit to the cellular network 101 the measurement of the performance indicator, the location, and the spatial orientation information, and so on. The at least one performance indicator may comprise a received signal strength, a bit error rate, a packet loss rate, a round trip time, a delay measure, a beam failure event, a radio link interruption event, a random access procedure failure event, or the like. The transmitting may be to the same one of the cell sites 111-113 that transmits the at least one wireless signal, or may be to a different one of the cell sites 111-113. For example, the UE 116 or UE 117 may collect a measurement of at least one performance indicator in an RRC_IDLE mode, and may transmit the measurement, along with a location and spatial orientation information, at a later time when the UE 116 or UE 117 reconnects to the cellular network 101, e.g., in an RRC_CONNECTED mode, which may involve a different cell site as the UE 116 or UE 117 moves throughout the environment. Notably, examples of the present disclosure may utilize measurements of network performance indicators from UEs (as well as from network components, such as cell sites 111-113) to identify potential locations (e.g., cells, cell sectors, or specific locations that may be experiencing connection failures, handover failures, call drops, degraded throughput performance, and so forth) for deployment of AVs for drive test/channel sounding measurements. For instance, AVs may follow up at locations of suspected network performance issues to gather additional network performance indicator measurements/channel sounding measurement records to identify root causes, to confirm (or refute) conditions suspected from network performance identifier measurements from UEs, base stations, and so forth.

Each of the AVs 120 and 121 may be equipped with an associated on-board unit (OBU) for communicating with various external entities, e.g., via one or more of the RSUs 162 of DSRC network 120, cell sites 111-113, etc. In accordance with the present disclosure each of the AVs 120 and 121 is equipped for autonomous drive testing/channel sounding and may include at least one cellular receiver and/or transceiver (broadly a "radio unit") that is equipped to operate according to the specification of the considered wireless cellular communications standard (e.g., long term evolution (LTE), 5G multiple input multiple output (MIMO) and/or millimeter wave, etc.). However, the at least one radio unit may be configured with additional capabilities, including the ability to beam sweep the receive beam, and so on. In one example, the at least one radio unit may include one or more transceivers for non-cellular wireless communications, such as DSRC communications, IEEE 802.11-based communications, etc. Each of the AVs 120 and 121 may further include a Global Positioning System (GPS) navigation unit, which may enable the AV to navigate a specified route and to also identity locations at which network performance indicator measurements are collected. In one example, the radio unit and/or GPS navigation unit may be considered a component of the OBU. In one example, each of the AVs 120 and 121 (e.g., the OBUs thereof) may comprise all or a portion of a computing device or system, such as computing system 400, and/or processing system 402 as described in connection with FIG. 4 below, and may be configured to provide one or more functions such as those described below in connection with the example method 300 of FIG. 3.

In one example, the EPC network 105 provides various functions that support wireless services in the LTE/5G environment. In one example, EPC network 105 is an Internet Protocol (IP) packet core network that supports both real-time and non-real-time service delivery across a LTE network, e.g., as specified by the 3GPP standards. In one example, cell sites 111 and 112 in the access network 103 are in communication with the EPC network 105 via baseband units in BBU pool 114. In operation, UE 116 may access wireless services via the cell site 111 and UE 117 may access wireless services via the cell site 112 located in the access network 103. It should be noted that any number of cell sites can be deployed in access network. In one illustrative example, the access network 103 may comprise one or more cell sites.

In EPC network 105, network devices such as Mobility Management Entity (MME) 107 and Serving Gateway (SGW) 108 support various functions as part of the cellular network 101. For example, MME 107 is the control node for the LTE access network. In one embodiment, MME 107 is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-cell handovers and as the anchor for mobility between 5G, LTE and other wireless technologies, such as 2G and 3G wireless networks.

In addition, EPC network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a packet data network (PDN) gateway 110 which serves as a gateway that provides access between the EPC network 105 and various data networks, e.g., service network 140, IMS core network 115, other network(s) 180, and the like. The packet data network gateway 110 is also referred to as a PDN gateway, a PDN GW or a PGW. In addition, the EPC network 105 may include a Diameter routing agent (DRA) 106, which may be engaged in the proper routing of messages between other elements within EPC network 105, and with other components of the system 100, such as a call session control function (CSCF) (not shown) in IMS core network 115. For clarity, the connections between DRA 106 and other components of EPC network 105 are omitted from the illustration of FIG. 1.

In one example, the internal communications of the DSRC network 160 may use a 75 MHz frequency band around 5.925 GHz assigned by the Federal Communication Commission (FCC) of the United States for Intelligent Transportation Systems, or DSRC networks. In general, DSRC networks enable wireless vehicle-to-vehicle communications and vehicle-to-infrastructure communications. DSRC networks may exist for transmitting safety and road condition information to vehicles, to warn of traffic and weather, to sense nearby vehicles (e.g., blind spot detection), and so forth. In this regard, DSRC networks contemplate an on-board unit (OBU) for DSRC-enabled vehicles to transmit, as well as to receive and display messages. Accordingly, as illustrated in FIG. 1, DSRC network 160 may interconnect and control a number of infrastructure elements, also referred to herein as roadway resources, which include roadside units (RSUs) 162. Other infrastructure elements that are not specifically illustrated in FIG. 1 may also comprise part of the DSRC network 160, e.g., traffic lights, informational signs (e.g., road-side display screens), restricted access gate(s), movable barrier gates, movable bollards, and so forth. DSRC network 160 may also include one or more servers (not shown) for managing infrastructure elements, for communicating with other elements and for controlling other aspects of the DSRC network 160. In one example, DSRC network 160 may comprise a hybrid network. For instance, RSUs 162 and OBUs of various vehicles (such as AVs 120 and 121, etc.) may communicate wirelessly in accordance with the DSRC specification(s).

It should also be noted that DSRC network 160 may operate in accordance with alternative or additional technologies. For instance, RSU(s) 162 may alternatively or additional comprise access points (APs) that may establish a wireless local area network (WLAN), e.g., an Institute for Electrical and Electronics Engineers (IEEE) 802.11 network (e.g., a Wi-Fi network), an IEEE 802.15 network, e.g., a Bluetooth network, a ZigBee network, and so forth, a mesh network comprising a combination of interconnected devices using a plurality of such communication modalities and protocols, or the like. In accordance with the present disclosure, AVs 120 and 121 may upload network performance indicator measurements/channel sounding measurement records to the cellular network 101 via RSUs 162. In this regard, RSUs 162 may be connected to AS 130 and/or AS 145 as illustrated in FIG. 1. As further noted above, in one example, DSRC network 160 may also be operated by and/or be a part of the cellular network 101.

In one example, service network 140 may comprise one or more devices, such as application server (AS) 145 for providing services to subscribers, customers, and or users. For example, cellular network 101 may provide a cloud storage service, web server hosting, and other services. As such, service network 140 may represent aspects of cellular network 101 where infrastructure for supporting such services may be deployed. In one example, AS 145 may comprise all or a portion of a computing device or system, such as computing system 400, and/or processing system 402 as described in connection with FIG. 4 below, specifically configured to provide one or more service functions in accordance with the present disclosure, such as a network-based secure data storage for channel sounding measurement records and/or network performance indicator measurement records. For instance, cell sites 111-113 may collect network performance indicator measurements themselves, from UE 116 and/or UE 117, and so forth, and may forward the performance indicator measurement records to AS 145 for storage. Although a single application server, AS 145, is illustrated in service network 140, it should be understood that service network 140 may include any number of components to support one or more services that may be provided to one or more subscribers, customers, or users by the cellular network 101.

In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general.

In accordance with the present disclosure, any one or more of the components of EPC network 105 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 107 may comprise a vMME, SGW 108 may comprise a vSGW, and so forth. In this regard, the EPC network 105 may be expanded (or contracted) to include more or less components than the state of EPC network 105 that is illustrated in FIG. 1. In this regard, the EPC network 105 may also include a self-optimizing network (SON)/software defined network (SDN) controller 190.

In one example, SON/SDN controller 190 may function as a self-optimizing network (SON) orchestrator that is responsible for activating and deactivating, allocating and deallocating, and otherwise managing a variety of network components. For instance, SON/SDN controller 190 may activate and deactivate antennas/remote radio heads of cell sites 111 and 112, respectively, may allocate and deactivate baseband units in BBU pool 114, and may perform other operations for activating antennas based upon a location and a movement of a mobile endpoint device or a group of mobile endpoint devices, in accordance with the present disclosure.

In one example, SON/SDN controller 190 may further comprise a SDN controller that is responsible for instantiating, configuring, managing, and releasing VNFs. For example, in a SDN architecture, a SDN controller may instantiate VNFs on shared hardware, e.g., NFVI/host devices/SDN nodes, which may be physically located in various places. In one example, the configuring, releasing, and reconfiguring of SDN nodes is controlled by the SDN controller, which may store configuration codes, e.g., computer/processor-executable programs, instructions, or the like for various functions which can be loaded onto an SDN node. In another example, the SDN controller may instruct, or request an SDN node to retrieve appropriate configuration codes from a network-based repository, e.g., a storage device, to relieve the SDN controller from having to store and transfer configuration codes for various functions to the SDN nodes.

In one example, SON/SDN controller 190 may comprise all or a portion of a computing device or system, such as computing system 400, and/or processing system 402 as described in connection with FIG. 4 below, and may be configured to provide one or more functions for adjusting at least one aspect of a cellular network in response to at least one channel sounding measurement record obtained from an autonomous vehicle, such as described in connection with the example method 200 of FIG. 2, and for performing various other operations in accordance with the present disclosure. For example, SON/SDN controller 190 may ensure that a cell site 111-113 and/or baseband unit of BBU pool 114 is provisioned with configuration code which, when executed by a processing system of the respective component(s), cause various operations in connection with the examples of FIGS. 2 and 3 to be performed. For instance, SON/SDN controller 190 may store such configuration code and provision the code to the respective component(s), or may direct the respective component(s) to obtain the configuration code from another repository.

In accordance with the present disclosure, SON/SDN controller 190 may therefore control various components within EPC network 105 and/or within access network 103 to support the traffic that is accommodated by the activation of antennas/remote radio heads of cell sites 111 and 112, respectively and the allocation of baseband units in BBU pool 114. For instance, SON/SDN controller 190 (e.g., performing functions of a SON orchestrator) may activate an antenna of cell site 111 and assign a baseband unit in BBU pool 114 when a group of a mobile endpoint device is detected near the cell site 111. SON/SDN controller 190 (e.g., performing functions of a SDN controller) may further instantiate VNFs to function as routers, switches, gateways, and the like to ensure that sufficient backhaul resources are available for the traffic to transit the access network 103 and/or EPC network 105. In addition, as mentioned above, any one or more of the DRA 106, MME 107, SGW 108, HSS 109, and PGW 110 may comprise VNFs instantiated on host devices. As such, SON/SDN controller 190 may perform similar operations to instantiate, configure, reconfigure, and decommission such components in support of examples of the present disclosure.

In one example, SON/SDN controller 190 may retrieve and process network performance indicator measurement records from AS 145, where the records may be stored after collection via cell sites 111-113, and may adjust aspects of cellular network 101 in response to the measurements of performance indicators collected by UE 116, UE 117, and/or cell sites 111-113, such as: activating a remote radio head, activating a baseband unit, deactivating a remote radio head, deactivating a baseband unit, changing a transmit power of a base station, changing a boresight direction of an antenna array (including adjusting tilt and azimuth bearing), changing a beamwidth of a gain pattern of an antenna array, changing a channel coding scheme availability at a base station, changing a base station backhaul configuration, and so forth.

Accordingly, the SON/SDN controller 190 may be connected directly or indirectly to any one or more network elements of EPC network 105, and of the system 100 in general. Due to the relatively large number of connections available between SON/SDN controller 190 and other network elements, none of the actual links to the application server are shown in FIG. 1. Similarly, intermediate devices and links between DRA 106, MME 107, SGW 108, cell sites 111 and 112, PDN gateway 110, and other components of system 100 are also omitted for clarity, such as additional routers, switches, gateways, and the like.

As further illustrated in FIG. 1, EPC network 105 may further include an application server (AS) 130, which may comprise all or a portion of a computing device or system, such as computing system 400, and/or processing system 402 as described in connection with FIG. 4 below, and may be configured to perform various operations for adjusting at least one aspect of a cellular network in response to at least one channel sounding measurement record obtained from an autonomous vehicle, such as illustrated in FIG. 2 and described in greater detail below, and for performing various other operations in accordance with the present disclosure. In one example, AS 130 may comprise a drive test/channel sounding system as described herein. For instance, AS 130 may receive from AV 120 and/or AV 121 one or more channel sounding measurement records (e.g., including at least one measurement of at least one network performance indicator), and may adjust at least one aspect of the cellular network 101 in response to the channel sounding measurement record(s). In one example, the receiving of the one or more channel sounding measurement records may be implemented via DSRC network 160. In another example, the receiving of the one or more channel sounding measurement records may be implemented via cell sites 111-113. In still another example, the channel sounding measurement record may be stored in a record, e.g., at AS 145. As such, the receiving may comprise AS 130 retrieving the record from AS 145. In one example, the adjusting the at least one aspect of the cellular network 101 may comprise activating a remote radio head, activating a baseband unit, deactivating a remote radio head, deactivating a baseband unit, changing a transmit power of a base station, changing a boresight direction of an antenna array (including adjusting tilt and azimuth bearing), changing a beamwidth of a gain pattern of an antenna array, changing a channel coding scheme availability at a base station, changing a base station backhaul configuration, and so forth. In one example, AS 130 may configure components of the cellular network 101 directly. For instance, AS 130 may maintain communications with BBU pool 114, cell sites 111-113, and so forth, via PDN gateway 110 and SGW 108, for example.

In another example, AS 130 may send a command or request to SON/SDN controller 190 for the SON/SDN controller 190 to configure the relevant component(s) of the cellular network 101. In this regard, it should be noted that some of the functions described herein with respect to SON/SDN controller 190 may instead be performed by AS 130, and vice versa. However, it should also be noted that in some examples, network misconfiguration may lead to network performance degradation that may be detected in network performance indicator measurements/channel sounding measurement records from AVs 120 and 121 that are not necessarily identifiable in the network performance indicator measurements from UEs 116 and 117. For instance, a first cell sector of a first cell may primarily serve UEs in an area but may have a temporary line of sight obstruction. However, a second sector of a second nearby cell may pick up these UEs. As such, these UEs may not report any degraded network performance metrics and the SON/SDN controller 190 may be unaware of any problem. However, AS 130 may identify that fewer than average/normal number of network performance indicator metrics are received from UEs regarding the first sector of the first cell. Thus, AS 130 may dispatch AV 120 to capture measurements specific to the first sector of the first cell. From the channel sounding measurement record/network performance indicator measurement(s) from AV 120, AS 130 may determine that there is actually a radio channel quality issue with regard to the first sector of the first cell. In addition, AS 130 may then reconfigure the first sector of the first cell, e.g., to adjust a beam to find one or more multi-path beam angles, such as reflections off buildings, etc. that may better serve the location. Alternatively, AS 130 may inform SON/SDN controller 190, which, having been made aware of such a problem, to instruct the base station/cell site to perform a beam adjustment procedure.

In addition, in one example, AS 130 (or similarly SON/SDN controller 190) may also configure AVs 120 and 121, etc. to perform one or more operations such as described in greater detail below in connection with the example method 300 of FIG. 3. For example, AS 130 may also configure AV 120, and/or AV 121 to navigate particular routes and/or to navigate to particular locations, to collect measurements of a particular type of performance indicator, to collect measurements with a particular periodicity, to report measurements with a particular periodicity, to report measurement records on demand, to report measurement records via a particular type of radio access technology (e.g., via DSRC network 160 (e.g., via one or more of RSUs 162), via LTE components of cellular network 101, etc.), to report measurement records when a measurement of a performance indicator exceeds a fixed or relative threshold, and so on.

To further illustrate, in one example, AS 130 may assign AVs (e.g., including at least AVs 120 and 121) to routes and/or to locations in accordance with a route optimization algorithm (e.g., an algorithm for a solution to a vehicle routing problem, or a vehicle routing problem (VRP) algorithm). In one example, the route optimization algorithm may include at least one capacity constraint and at least one penalty factor. For instance, the at least one capacity constraint may comprise a fuel/battery charge and/or distance limit associated with an AV, a distance limit for a route (e.g., a maximum route length that may be selected/configured by a network operator), or the like. The penalty factor may comprise a penalty for omitting a potential route location from the first route, the penalty associated with an importance level associated with the potential route location. For instance, AS 130 and/or SON/SDN controller 190 may identify network issues (e.g., suspected network issues) based on prior collected channel sounding measurement records from one or more AVs, and/or from network performance indicator measurements from UEs or from one or more network elements. In addition, AS 130 and/or SON/SDN controller 190 may label these network issues with importance levels, e.g., according to one or more predefined rules. For example, for handover failures above a 5 percent rate over the course of two hours, an importance level may be "1," while handover failure above a 20 percent rate over the course of two hours may be an importance level of "2," and so forth. Similarly, modest declines in throughput may be level "1," while a suspected false base station may be level "4." Notably, the penalty factor may help to eliminate potential route locations from the route which are too far out of the way and/or of lower importance such that the route traverses through locations that are more optimal for maximizing the fulfillment of demand for network performance indicator measurements per unit time.

In one example, a route may comprise waypoints selected from among potential route locations, e.g., locations specifically designated for obtaining drive test/channel sounding measurements. In other words, a route is selected to include at least a portion of the plurality of potential route locations. For instance, each potential route location may comprise a "stop" that may be accommodated into a route comprising a solution via the VRP algorithm. Thus, for example, the penalty may be equal to the demand/importance associated with the potential route location, or may be scaled by a scaling factor. As such, the VRP algorithm may permit dropped "nodes" or dropped stops. Thus, not all of the potential route locations may be included in the route solution. In one example, when AS 130 identifies new network issues at various locations and/or changes in priority/importance, AV routes may be updated and instructions sent to the AVs (e.g., including at least AVs 120 and 121).

In one example, AS 130 and/or SON/SDN controller 190 may apply various AI/ML processes to detect network issues, or potential network issues, from network performance indicator measurements, which may indicate locations for follow up measurements via automated drive test/channel sounding. Similarly, AS 130 and/or SON/SDN controller 190 may apply AI/ML processes for identifying network issues/potential network issues and/or root-cause analysis in response to additional channel sounding measurement records obtained by AVs 120, 121, etc. For instance, this may include applying various rules, policies, thresholds, etc. to various network performance indicator measurements. Similarly, one or more ML modules may comprise detection models for detecting network issues, such as denial of service attacks, false base stations, neighboring cell/sector interference, line of sight blockage, and so forth. In general, the ML detection modules may be based on various types of machine learning models, or machine learning algorithms. In addition, AS 130 and/or SON/SDN controller 190 may implement one or more actions corresponding to the outputs of the AI/ML processes (such as dispatching AVs for further measurements, reconfiguring the network via SON/SDN controller 190, and so forth). In one example, SON/SDN controller 190 may reconfigure one of the cell sites 111-113, where an AV may be dispatched for drive test/channel sounding to verify that the impact of the network change(s) is/are positive, and so forth. In this regard, it should be noted that the corresponding actions may be learned and optimized in accordance with similar learning frameworks, such as reinforcement learning, a reward maximization algorithm, etc. In one example, the drive test/channel sounding measurement records may further support such reinforcement learning, e.g., such that actions of SON/SDN controller 190 that do not result in anticipated network improvements or that result in network degradations may be uncovered and rolled-back, and in addition may not be implemented in other cells/sectors due to updating of the corresponding model(s).

It should be noted that as referred to herein, a machine learning model (MLM) (or machine learning-based model) may comprise a machine learning algorithm (MLA) that has been "trained" or configured in accordance with input training data to perform a particular service. For instance, an MLM may comprise a deep learning neural network, or deep neural network (DNN), a convolutional neural network (CNN), a generative adversarial network (GAN), a decision tree algorithm/model, such as gradient boosted decision tree (GBDT) (e.g., XGBoost, XGBR, or the like), a support vector machine (SVM), e.g., a non-binary, or multi-class classifier, a linear or non-linear classifier, k-means clustering and/or k-nearest neighbor (KNN) predictive models, a regression model, an autoencoder, or encoder-decoder network, e.g., a variational autoencoder, a shallow encoder deep decoder network, etc., and so forth. In one example, the MLA may incorporate reinforcement learning (e.g., using positive and negative examples after deployment as a MLM), and so forth. It should be noted that different ML/AI models may be selected for each network performance indicator and/or for each data source, e.g., where the selection may depend on the characteristics of the network performance indicator and/or the data source. Supervised learning models, e.g., based on logistic regression classification, support vector machine (SVM) classification, and so forth may be adopted for some network performance indicators, and deep-learning models, e.g., long short-term memory (LSTM)-based models, or the like, may be adopted for other network performance indicators.

In an illustrative example, AS 130 may determine initial routes for AVs 120 and 121 to pass through to collect data. OBUs of AVs 120 and 121 may collect the data (such as radio frequency bearer interruptions, call failures, call drops, handover failures) while navigating such routes. The network performance indicator measurements may be ingested (e.g., populated into channel sounding measurement records), grouped, and stored in one or more output files.

The OBUs of AVs 120 and 121 may then listen for nearby RSUs (e.g., RSUs 162) during the drive testing for offloading the collected data in batch or in streaming mode to AS 130 and/or to AS 145. AS 130 may then apply AI/ML processes in batch/offline and/or real-time modes to infer actionable information about the RF quality or other network statistics, such as call drops/handover failures, etc. In one example, AS 130 may retrieve records from AS 145. AS 130 may further send actionable information to SON/SDN controller 190, which in turn may determine (e.g., based on pre-populated logic) specific content/corrective actions, which may include configuring or reconfiguring one or more elements of cellular network 101, presenting alerts, warnings, messages, or the like to network personnel in a network operations center (NOC) or the like.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, the system 100 may be expanded to include additional networks, such as network operations center (NOC) networks, additional access networks, and so forth. For instance, cellular network 101 may comprise a cellular network portion of a communication service provider network that provides additional communication services for data, voice, video content delivery, and so forth, and that may include any one or more of an integrated services digital network (ISDN), fiber optic access networks (e.g., fiber to the curb (FTTC) and/or fiber to the premises (FTTP) access networks), Digital Subscriber Line (DSL) networks, broadband cable access networks, one or more metro, regional, and/or national backbone networks, etc. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For instance, in one example, SON/SDN controller 190 may be spilt into separate components to operate as a SON orchestrator and a SDN controller, respectively. Similarly, although the SON/SDN controller 190 is illustrated as a component of EPC network 105, in another example SON/SDN controller 190, and/or other network components may be deployed in an IMS core network 115 instead of being deployed within the EPC network 105, or in other portions of system 100 that are not shown, while providing essentially the same functionality. Similarly, functions described herein with respect to AS 130 and/or SON/SDN controller 190 may alternatively or additional be provided by AS 145, and vice versa. In other words, any one or more of these components may comprise a drive test/channel sounding system as described herein.

In addition, although aspects of the present disclosure have been discussed above in the context of a long term evolution (LTE)-based wireless network, examples of the present disclosure are not so limited. Thus, the teachings of the present disclosure can be applied to other types of wireless networks (e.g., a 2G network, a 3G network, a 5G network, an integrated network, e.g., including any two or more of 2G-5G infrastructure and technologies, and the like), that are suitable for use in connection with examples of the present disclosure for channel sounding via an in-service base station. For example, as illustrated in FIG. 1, the cellular network 101 may represent a "non-stand alone" (NSA) mode architecture where 5G radio access network components, such as a "new radio" (NR), "gNodeB" (or "gNB"), and so forth are supported by a 4G/LTE core network (e.g., a Evolved Packet Core (EPC) network 105). However, in another example, system 100 may instead comprise a 5G "standalone" (SA) mode point-to-point or service-based architecture where components and functions of EPC network 105 are replaced by a 5G core network, which may include an access and mobility management function (AMF), a user plane function (UPF), a session management function (SMF), a policy control function (PCF), a unified data management function (UDM), an authentication server function (AUSF), an application function (AF), a network repository function (NRF), and so on. For instance, in such a network, application server (AS) 130 of FIG. 1 may represent an application function (AF) for adjusting aspects of a cellular network in response to measurements of performance indicators by a mobile endpoint device at particular locations and orientations, and for performing various other operations in accordance with the present disclosure. In addition, any one or more of the cell sites 111-113 may comprise 2G, 3G, 4G and/or LTE radios, e.g., in addition to 5G new radio (NR) functionality. For instance, in non-standalone (NSA) mode architecture, LTE radio equipment may continue to be used for cell signaling and management communications, while user data may rely upon a 5G new radio (NR), including millimeter wave communications, for example. Thus, these and other modifications are all contemplated within the scope of the present disclosure.

FIG. 2 illustrates a flowchart of an example method 200 for adjusting at least one aspect of a cellular network in response to at least one channel sounding measurement record obtained from an autonomous vehicle, in accordance with the present disclosure. In one example, steps, functions and/or operations of the method 200 may be performed by a device as illustrated in FIG. 1, e.g., an application server and/or an SON/SDN controller, or any one or more components thereof, such as a processing system, a processing system in conjunction with remote radio heads and/or antenna arrays, and so forth. Alternatively, or in addition, the steps, functions and/or operations of the method 200 may be performed by a processing system comprising a plurality of devices as illustrated in FIG. 1, such as an application server, an SON/SDN controller, a base station, a serving gateway, and so forth. In one example, the steps, functions, or operations of method 200 may be performed by a computing device or system 400, and/or a processing system 402 as described in connection with FIG. 4 below. For instance, the computing device 400 may represent at least a portion of an application server, a SON/SDN controller, and so forth, in accordance with the present disclosure. For illustrative purposes, the method 200 is described in greater detail below in connection with an example performed by a processing system, such as processing system 402. The method 200 begins in step 205 and may proceed to optional step 210, optional step 220, or step 230.

At optional step 210, the processing system (e.g., of a cellular network) may configure a first autonomous vehicle (AV) to collect at least one network performance indicator associated with the cellular network. For instance, the processing system may send one or more instructions to the first AV to navigate a route and/or to travel to one or more particular locations/destinations, to collect measurements of a particular type of network performance indicator, to collect measurements with a particular periodicity, to report measurements with a particular periodicity, to report measurement records on demand, to report measurement records when a measurement of a performance indicator exceeds a fixed or relative threshold, and so on. In one example, the instruction may be sent via at least one of: radio resource control signaling, preconfiguration signaling, or application layer signaling. In one example, the notification is sent via out-of-band signaling, e.g., via a DSRC network, or the like.

At optional step 220, the processing system may transmit at least one wireless signal, e.g., from a base station of the cellular network. For instance, in one example, the processing system may be a part of the base station. In another example, the processing system may send instructions to the base station to transmit the at least one wireless signal. The at least one wireless signal may comprise a signal (or a channel) related to initial access procedures, such as a primary synchronization signal (PSS), a secondary synchronization signal (SSS), a physical broadcast channel (PBCH), and/or a downlink modulation reference signal (DMRS)) contained within a synchronization signaling (SS) block). In one example, the at least one wireless signal may comprise a reference signal (RS), or multiple reference signals, as an alternative or in addition to the SS block, such as a channel station information reference signal CSI-RS. In one example, the at least one wireless signal is transmitted via a directional antenna, e.g., a phased array antenna for beamforming. Thus, the at least one wireless signal may be associated with a particular transmit beam or transmit beam direction (in azimuth and elevation) with respect to the phased antenna array. In one example, the at least one wireless signal may comprise a plurality of wireless signals, such as successive synchronization signals or reference signals over multiple bursts via the same or different transmit beams, and so forth. In various examples, the base station may comprise a fixed-location base station, a mobile-location base station (e.g., a cell on wheels (CoW) or the like), or other moveable cellular transmitters/transceivers deployed by the cellular network, such as a dedicated channel sounding transmitter or transceiver.

At step 230, the processing system receives at least a first measurement of at least one network performance indicator associated with the cellular network from at least one of: at least a first channel sounding measurement record from at least the first AV, or a communication from at least one mobile endpoint device or at least one component of the cellular network. In one example, the measurement of the performance indicator is based upon at least one wireless signal from a base station of the cellular network (e.g., as described above in connection with optional step 220). In one example, the at least the first measurement of the at least one network performance indicator may be collected by the first AV based upon a pre-configuration or based upon a configuration instruction received by the AV and sent by the processing system at optional step 210.

The at least one network performance indicator may comprise a received signal strength, a bit error rate, a packet loss rate, a round trip time, a delay measure, a beam failure event, a radio link interruption event, a random access procedure failure event, or the like. The at least one network performance indicator may alternatively or additionally comprise a call drop event or handover failure event (e.g., for a data connection or voice call, etc.), as identified by a UE, a cell throughput, call failure, or handover failure rate exceeding a threshold (e.g., 5% or greater call drop or call setup failure rate, etc. for more than 30 minutes, more than 3 hours, etc.). In an example in which the at least the first measurement of the at least one network performance indicator is obtained from at least a first channel sounding measurement record, the at least the first channel sounding measurement record may further include a timestamp, an indicator of the location, and/or spatial orientation information, and so forth. In one example, the at least the first channel sounding measurement record may be obtained from the first AV via at least one roadside unit. In one example, the at least the first channel sounding measurement record may be obtained via radio resource control signaling, pre-configuration signaling, application layer signaling, or out-of-band signaling. In one example, the receiving/obtaining of optional step 230 may be via a different base station or cell site than the base station from which the at least one wireless signal is transmitted.

At step 240, the processing system identifies at least one condition of a location based upon the at least the first measurement of the at least the first network performance indicator. In one example, the at least the first measurement may comprise a plurality of measurements (e.g., round trip delay measurements from multiple UEs being served by a cell sector, signal to noise ratios or one or more waveforms transmitted by the base station/sector antennas as measured by multiple UEs, call failures experienced by multiple UEs, etc.). In one example, the at least one condition may be determined over multiple measurements from network equipment, UEs, and/or AVs over a period of time, e.g., problem lasting more than 15 minutes, problem occurring in more than 20 percent of RAN attach, handover, or call setups in a sliding time window, etc., call drops exceeding 5 percent for more than 5 minutes, call setup failures exceeding 5 percent for more than 5 minutes, and so forth. In one example, the at least one condition may comprise the at least the first measurement exceeding a maximum threshold or a falling below a minimum threshold associated with the at least one network performance indicator. Alternatively, or in addition, the at least one condition may be a root cause condition or apparent cause condition based on the at least the first measurement. In one example, the at least one condition may include a failure to obtain one or more measurements at a location (e.g., a bad reading, an inconclusive reading, etc.). In one example, step 240 may comprise applying one or more AI/ML processes such as described above to detect the at least one network condition.

At step 250, the processing system directs at least one of the first AV or a second AV to the location to capture at least a second channel sounding measurement record associated with at least one wireless signal from at least one base station of the cellular network, e.g., in response to the at least one condition being determined at step 240. In one example, the at least one of the first AV or the second AV is navigating a prior assigned route, and wherein the directing comprises directing the at least one of the first AV or the second AV along a new route that includes the location. As noted above, in one example, the condition may be a failure to obtain one or more measurements at a location. In such case, an AV can be sent back to the location via the directing of step 250. For instance, in one example, the at least the first measurement may be obtained via the at least the first channel sounding measurement from the at least the first AV, and the directing may comprise directing the at least the first AV to the location to capture the at least the second channel sounding measurement record.

At step 260, the processing system obtains from the first AV or the second AV the at least the second channel sounding measurement record. For instance, the at least the second channel sounding measurement record may comprise at least a second measurement of the at least one network performance indicator. In one example, the at least the second channel sounding measurement record may further include a timestamp, an indicator of the location, and/or spatial orientation information, and so forth. In one example, the at least the second measurement of the at least one network performance indicator may relate to a same network performance indicator as the at least the first measurement. Alternatively, or in addition, the at least the second measurement of the at least one network performance indicator may relate to a different network performance indicator of the at least one network performance indicator. For example, the at least the first measurement may comprise a call drop ratio, while the at least the second measurement may comprise a signal to noise ratio of one or more channel sounding waveforms, e.g., in an attempt to identify a root cause of a high call drop ratio, or the like. In one example, the at least the second channel sounding measurement record is obtained via at least one roadside unit (RSU) (e.g., that is in communication with the processing system). In one example, the obtaining may be via radio resource control signaling, pre-configuration signaling, application layer signaling, or out-of-band signaling. In one example, the obtaining may be via a different base station or cell site than the base station from which the at least one wireless signal is transmitted. In one example, the first AV or second AV may take measurements from dedicated channel sounding waveforms. In one example, the instructions may include a copy of the waveform to be used for measurement. In another example, the first AV or the second AV may already have copies of one or more waveforms. In one example, the instruction may identify the waveform, or waveforms to be used for the channel sounding/drive test/network performance indicator measurement(s).

At step 270, the processing system adjusts at least one aspect of the cellular network in response to the at least the second channel sounding measurement record. In one example, the adjusting of the at least one aspect of the cellular network may be further in response to the at least the first measurement of at least one network performance indicator. For instance, the second channel sounding measurement record can confirm an existence of a condition suspected from the at least the first measurement of at least one network performance indicator, can contradict the suspected condition, determination of condition can be based on both (e.g., the at least the first measurement of the at least one network performance indicator and the at least the second channel sounding measurement may individually be insufficient to determine a condition, but together, can be indicative of the condition, e.g., with a greater confidence). In one example, optional step 270 may further include determining the existence of a network issue, e.g., and not a UE issue. For instance, one or multiple UEs may experience a similar performance degradation issue due to a faulty operating system or firmware update, or other causes beyond the control of the cellular network. On the other hand, a network issue may include: congestion, physical link failure, network attack, or network misconfiguration (including neighboring cell misconfiguration, base station power level misconfiguration, backhaul misconfiguration, SGW or PDN gateway misconfiguration).

The adjusting of the at least one aspect of the cellular network may include: activating a remote radio head, activating a baseband unit, deactivating a remote radio head, deactivating a baseband unit, changing a transmit power of a base station, changing a boresight direction of an antenna array (including adjusting tilt and azimuth bearing), changing a beamwidth of a gain pattern of an antenna array, changing a channel coding scheme availability at a base station, changing a base station backhaul configuration, and so forth. For instance, the processing system may determine that the location may be subject to a relatively greater number of link failure events with respect to a cell site in a given direction/orientation from the area. For example, the location may be a sidewall across the street from a cell site, where there is a large amount of truck traffic which may temporarily block line-of-sight communications. In such case, the processing system may adjust a boresight of an antenna array of the base station e.g., using electro-mechanical elevation or azimuth tilt which may provide a relatively greater number of directional beams in other directions which may reach the mobile endpoint devices in the area via multiple alternative paths, e.g., reflections off of nearby buildings, and the like. In another example, there may be a remote radio head available on the same side of the street that may not be subject to the same path blocking as signals from the other base station. Therefore, step 270 may comprise activating a remote radio head to better serve the location. It should be noted that step 270 may comprise any number of different types of remedial actions to configure or reconfigure the cellular network in response to the at least the second channel sounding measurement record.

Following step 270, the method 200 proceeds to step 295 where the method ends.

It should be noted that the method 200 may be expanded to include additional steps, or may be modified to replace steps with different steps, to combine steps, to omit steps, to perform steps in a different order, and so forth. For instance, in one example the processing system may continue to repeat one or more steps of the method 200, such as steps 210-270 or steps 230-270 for additional locations, for additional AVs deployed by the cellular network for autonomous drive tests/channel sounding, and so forth. For instance, examples of the present disclosure enable ongoing/continuous drive testing for dynamic learning, gap-filling in knowledge, or adapting to changes in network conditions including interference from misconfigurations of adjacent and/or nearby cells, network attacks, misconfiguration of network elements, external physical conditions that may affect the network, such as new buildings, long-term but temporary obstructions (e.g., a circus in town for two weeks, etc.). In one example, the method 200 may comprise generating and presenting a report, e.g., to network personnel or one or more other automated systems of the cellular network. In one example, the method 200 may further involve identifying measurements for one or more locations on a route of a third AV route that is/are captured by the first AV or the second AV that is diverted from a previously scheduled route to go to a priority location, e.g., as directed in step 250. For instance, the first AV or the second AV may capture network performance indicator measurements for incidental/non-priority locations as a consequence of navigating to the priority location. As such, the third AV may be provided with a new/updated route that may exclude all or a portion of such locations. In one example, the actions of step 270 may be determined in accordance with a reinforcement learning (RL) framework and/or reward maximization framework. In this regard, the method 200 may include repeating one or more steps to dispatch the same or different AV(s) to a cell site, sector, and/or specific location within a cell site or sector to capture additional measurements and to determine whether the network reconfiguration(s) resulted in improved network performance according to one or more network performance indicators (e.g., KPIs). In one example, the method 200 may be expanded or modified to include steps, functions, and/or operations, or other features described in connection with the example(s) of FIG. 1 and/or FIG. 3, or as described elsewhere herein. Thus, these and other modifications are all contemplated within the scope of the present disclosure.

FIG. 3 illustrates a flowchart of an example method 300 for transmitting channel sounding measurement records captured by an autonomous vehicle to a cellular network, in accordance with the present disclosure. In one example, steps, functions and/or operations of the method 300 may be performed by a device as illustrated in FIG. 1, e.g., an autonomous vehicle, or any one or more components thereof, such as an OBU, a radio unit, and so forth. In one example, the steps, functions, or operations of method 300 may be performed by a computing device or system 400, and/or a processing system 402 as described in connection with FIG. 4 below. For instance, the computing device 400 may represent at least a portion of an AV and or an OBU in accordance with the present disclosure. For illustrative purposes, the method 300 is described in greater detail below in connection with an example performed by a processing system, such as processing system 402. The method 300 begins in step 305 and proceeds to step 310.

At step 310, the processing system (e.g., of an autonomous vehicle (AV)) receives at least a first instruction directing the autonomous vehicle to navigate a first route to capture at least a first channel sounding measurement record (e.g., including at least one measurement of at least one network performance indicator associated with a cellular network). For instance, the at least one instruction may be received from the cellular network via one or more components of the cellular network and/or via one or more roadside units (RSUs) (e.g., of a DSRC network). For instance, the cellular network may configure the AV to start and stop collecting the network performance indicator measurements, to collect the network performance indicator measurements while the AV is not connected to the cellular network, to collect a subset of network performance indicator measurements that the AV is capable of collecting, to report a subset of the network performance indicator measurement records that the AV has collected (e.g., via the at least the first channel sounding measurement record), and so on.

At optional step 320, the processing system may capture the at least the first channel sounding measurement record. For instance, optional step 320 may include receiving at least one wireless signal from a base station of a cellular network. The base station may comprise a fixed-location base station, a CoW, a dedicated channel sounding transmitter deployed by the cellular network, or the like. The at least one wireless signal may comprise a signal (or a channel) related to initial access procedures, such as a PSS, an SSS, a PBCH, and/or a DMRS contained within an SS block, a reference signal, or multiple reference signals, as an alternative or in addition to the SS-block, such as a CSI-RS, and so forth. In one example, the at least one wireless signal may be transmitted via a directional antenna and may be associated with a particular transmit beam or transmit beam direction (in azimuth and elevation). In one example, the at least one wireless signal may be received via a particular receive beam, or receive beam direction, with respect to a radio unit of the processing system (e.g., of an OBU of the AV). For instance, receive beams may be identified by receive beam indexes/indices or logical beam identifiers (beam IDs). In one example, the at least one wireless signal may comprise a plurality of wireless signals, such as successive synchronization signals or reference signals over multiple bursts via the same or different transmit beams, and so forth.

In one example, the processing system may perform synchronization signal (SS) block RSRP and/or channel state information (CSI)-RSRP measurements, e.g., as part of beam management (BM) and/or beam recovery (BR) procedures in accordance with a cellular communication protocol employed by the cellular network. In one example, the capturing of the at least the first channel sounding measurement record (e.g., including at least one or more network performance indicator measurements) may be in accordance with an instruction received at step 310. The at least one network performance indicator measurement may comprise a measurement of a received signal strength, a bit error rate, a packet loss rate, a round trip time, a delay measure, etc., a recording of an instance of a beam failure event, a radio link interruption event, a random access procedure failure event, or the like, and so forth. In one example, optional step 320 may include recording a location, or locations, of the measurement(s), spatial orientation information (e.g., of the AV and/or processing system thereof, e.g., an OBU/radio unit, receive beam direction(s), and so forth). In addition, in one example, optional step 320 may include recording one or more timestamps of such measurement(s).

At optional step 330, the processing system may transmit the at least the first channel sounding measurement record to the cellular network. In one example, the at least the first channel sounding measurement record may be transmitted to the cellular network via at least one roadside unit (RSU). In one example, the transmitting may be via radio resource control signaling, pre-configuration signaling, application layer signaling, or out-of-band signaling. In one example, the transmitting may be to a different base station or cell site than the base station from which the at least one wireless signal is transmitted. In one example, the AV may store the channel sounding measurement records and may transmit them at a later time. For instance, the channel sounding measurement(s) records may be held and sent in batch periodically, and/or opportunistically when RSU is nearby (or alternatively, via one or more base stations of the cellular network). In one example, the at least the first channel sounding measurement record may be for at least a portion of the network performance indicator measurements/channel sounding measurement records that may be requested to be collected by the processing system in accordance with the instruction(s) of step 310.

At step 340, the processing system receives, while navigating the first route, at least one instruction directing the AV to a location that is not on the first route to capture at least a second channel sounding measurement record. For instance, step 340 may comprise the same or similar operations at step 310, only at a later time, and while interrupting the AV along the first route. As such, the AV may cease navigating the first route, and may begin navigating a second route to the location. In one example, the AV may select the second route. In another example, the at least one instruction that is received at step 340 may include information that identifies the second route for the AV to navigate.

At step 350, the processing system captures at the location, the at least the second channel sounding measurement record (e.g., comprising at least one measurement of at least one network performance indicator associated with the cellular network, and in some examples, further including a time stamp, location information, and/or spatial orientation information). For instance, step 350 may comprise operations similar to optional step 320, as described above.

At step 360, the processing system transmits, to the cellular network, the at least the second channel sounding measurement record. For example, the at least the second channel sounding measurement record may be transmitted to the cellular network via at least one RSU, or via radio resource control signaling, pre-configuration signaling, application layer signaling, or out-of-band signaling to the same or a different base station than the base station from which at least one wireless signal is transmitted and upon which the at least one network performance indicator measurement of the at least the second channel sounding measurement record is based.

Following step 360, the method 300 proceeds to step 395 where the method ends.

It should be noted that the method 300 may be expanded to include additional steps, or may be modified to replace steps with different steps, to combine steps, to omit steps, to perform steps in a different order, and so forth. For instance, in one example the processing system may continue to repeat one or more steps of the method 300, such as steps 310-360 or steps 340-360 for additional locations and/or routes. For instance, examples of the present disclosure enable ongoing/continuous drive testing for dynamic learning, gap-filling in knowledge, or adapting to changes in network conditions. In one example, the method 300 may be expanded or modified to include steps, functions, and/or operations, or other features described in connection with the example(s) of FIG. 1 and/or FIG. 2, or as described elsewhere herein. Thus, these and other modifications are all contemplated within the scope of the present disclosure.

In addition, although not specifically specified, one or more steps, functions, or operations of the respective methods 200 and 300 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 or FIG. 3 that recite a determining operation or involve a decision do not necessarily require that both branches of the determining operation be practiced. In other words, one of the branches of the determining operation can be deemed as an optional step. Furthermore, steps, blocks, functions or operations of the above described method(s) can be combined, separated, and/or performed in a different order from that described above, without departing from the example examples of the present disclosure.

FIG. 4 depicts a high-level block diagram of a computing device or processing system specifically programmed to perform the functions described herein. For example, any one or more components or devices illustrated in FIG. 1 or described in connection with the examples of FIGS. 2 and 3 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for adjusting at least one aspect of a cellular network in response to at least one channel sounding measurement record obtained from an autonomous vehicle or for transmitting channel sounding measurement records captured by an autonomous vehicle to a cellular network, and various input/output devices 406, e.g., one or more sensors, a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like). In accordance with the present disclosure input/output devices 406 may also include antenna elements, antenna arrays, remote radio heads (RRHs), baseband units (BBUs), transceivers, power units, and so forth.

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for adjusting at least one aspect of a cellular network in response to at least one channel sounding measurement record obtained from an autonomous vehicle or for transmitting channel sounding measurement records captured by an autonomous vehicle to a cellular network (e.g., a software program comprising computer-executable instructions) can be loaded into memory 404 and executed by hardware processor element 402 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for adjusting at least one aspect of a cellular network in response to at least one channel sounding measurement record obtained from an autonomous vehicle or for transmitting channel sounding measurement records captured by an autonomous vehicle to a cellular network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:

receiving, by a processing system of a cellular network, at least a first measurement of at least one network performance indicator associated with the cellular network from at least one of:

at least a first channel sounding measurement record from at least a first autonomous vehicle; or a communication from at least one mobile endpoint device, or at least one component of the cellular network;

identifying, by the processing system, at least one condition of a location based upon the at least the first measurement of the at least one network performance indicator;

directing, by the processing system, at least one of: the first autonomous vehicle or a second autonomous vehicle to the location to capture at least a second channel sounding measurement record associated with at least one wireless signal from at least one base station of the cellular network;

obtaining, by the processing system, from the first autonomous vehicle or the second autonomous vehicle, the at least the second channel sounding measurement record; and adjusting, by the processing system, at least one aspect of the cellular network in response to the at least the second channel sounding measurement record.

2. The method of claim 1, wherein the at least the second channel sounding measurement record comprises:

at least a second measurement of the at least one network performance indicator.

3. The method of claim 2, wherein the at least the second channel sounding measurement record further comprises:

a timestamp; and an indicator of the location.

4. The method of claim 2, wherein the at least the second channel sounding measurement record further comprises spatial orientation information.

5. The method of claim 1, wherein the at least one base station comprises:

a fixed-location base station; or a mobile-location base station.

6. The method of claim 1, wherein the at least one network performance indicator comprises at least one of:

a received signal strength;

a bit error rate;

a packet loss rate;

a round trip time;

a delay measure;

a beam failure event;

a radio link interruption event; or a random access procedure failure event.

7. The method of claim 6, wherein the at least one condition comprises the at least the first measurement exceeding a maximum threshold or a falling below a minimum threshold associated with the at least one network performance indicator.

8. The method of claim 1, wherein the adjusting is further in response to the at least the first measurement of the at least one network performance indicator.

9. The method of claim 8, wherein the adjusting the at least one aspect of the cellular network comprises at least one of:

activating a remote radio head;

activating a baseband unit;

deactivating a remote radio head;

deactivating a baseband unit;

changing a transmit power of a base station;

changing a boresight direction of an antenna array;

changing a beamwidth of a gain pattern of an antenna array;

changing a channel coding scheme availability at a base station; or changing a base station backhaul configuration.

10. The method of claim 1, wherein the at least the second channel sounding measurement record is obtained via at least one roadside unit.

11. The method of claim 1, wherein the at least the first measurement is obtained via the at least the first channel sounding measurement record from the at least the first autonomous vehicle, wherein the directing comprises directing the at least the first autonomous vehicle to the location to capture the at least the second channel sounding measurement record, and wherein the obtaining comprises obtaining the at least the second channel sounding measurement record from the at least the first autonomous vehicle.

12. The method of claim 1, wherein the at least one of: the first autonomous vehicle or the second autonomous vehicle is navigating a prior assigned route, and wherein the directing comprises directing the at least one of: the first autonomous vehicle or the second autonomous vehicle along a new route that includes the location.

13. A non-transitory computer-readable medium storing instructions which, when executed by a processing system including at least one processor when deployed in a cellular network, cause the processing system to perform operations, the operations comprising:

receiving at least a first measurement of at least one network performance indicator associated with the cellular network from at least one of:

at least a first channel sounding measurement record from at least a first autonomous vehicle; or a communication from at least one mobile endpoint device, or at least one component of the cellular network;

identifying at least one condition of a location based upon the at least the first measurement of the at least one network performance indicator;

directing at least one of: the first autonomous vehicle or a second autonomous vehicle to the location to capture at least a second channel sounding measurement record;

obtaining from the first autonomous vehicle or the second autonomous vehicle the at least the second channel sounding measurement record; and adjusting at least one aspect of the cellular network in response to the at least the second channel sounding measurement record.

14. An apparatus comprising:

a processing system including at least one processor; and a non-transitory computer-readable medium storing instructions which, when executed by the processing system when deployed in a cellular network, cause the processing system to perform operations, the operations comprising receiving at least a first measurement of at least one network performance indicator associated with the cellular network from at least one of:

at least a first channel sounding measurement record from at least a first autonomous vehicle; or a communication from at least one mobile endpoint device, or at least one component of the cellular network;

identifying at least one condition of a location based upon the at least the first measurement of the at least one network performance indicator;

directing at least one of: the first autonomous vehicle or a second autonomous vehicle to the location to capture at least a second channel sounding measurement record associated with at least one wireless signal from at least one base station of the cellular network;

obtaining from the first autonomous vehicle or the second autonomous vehicle, the at least the second channel sounding measurement record; and adjusting at least one aspect of the cellular network in response to the at least the second channel sounding measurement record.

15. The apparatus of claim 14, wherein the at least the second channel sounding measurement record comprises:

at least a second measurement of the at least one network performance indicator.

16. The apparatus of claim 15, wherein the at least the second channel sounding measurement record further comprises:

a timestamp; and an indicator of the location.

17. The apparatus of claim 15, wherein the at least the second channel sounding measurement record further comprises spatial orientation information.

18. The apparatus of claim 14, wherein the at least one base station comprises:

a fixed-location base station; or a mobile-location base station.

19. The apparatus of claim 14, wherein the at least one network performance indicator comprises at least one of:

a received signal strength;

a bit error rate;

a packet loss rate;

a round trip time;

a delay measure;

a beam failure event;

a radio link interruption event; or a random access procedure failure event.

20. The apparatus of claim 19, wherein the at least one condition comprises the at least the first measurement exceeding a maximum threshold or a falling below a minimum threshold associated with the at least one network performance indicator.

\* \* \* \* \*